United States Patent [19]

Ko

[11] Patent Number: 5,612,636
[45] Date of Patent: Mar. 18, 1997

[54] SHORT CIRCUIT POWER OPTIMIZATION FOR CMOS CIRCUITS

[75] Inventor: Uming Ko, Plano, Tex.

[73] Assignee: Texas Instruments Incorporated, Dallas, Tex.

[21] Appl. No.: 375,147

[22] Filed: Jan. 19, 1995

[51] Int. Cl.⁶ .................... H03K 19/0948; G06F 15/00
[52] U.S. Cl. ..................... 326/83; 327/170; 364/489; 364/490
[58] Field of Search ................... 326/83, 86, 121, 326/31, 34, 27; 327/170, 544; 364/488–489

[56] References Cited

U.S. PATENT DOCUMENTS

| | | | |
|---|---|---|---|
| 4,698,760 | 10/1987 | Lembach et al. | 364/490 |
| 4,727,266 | 2/1988 | Fujii et al. | 326/27 |
| 4,827,428 | 5/1989 | Dunlop et al. | 364/490 |
| 5,179,298 | 1/1993 | Hirano et al. | 326/83 |
| 5,349,534 | 10/1994 | Fujiki et al. | 364/490 |

OTHER PUBLICATIONS

H.J.M. Veendrick, "Short–Circuit Dissipation of Static CMOS Circuitry and Its Impact on the Design of Buffer Circuits", IEEE Journal of Solid–State Circuits, vol. SC–19, No. 4, Aug. 1984, pp. 468–473.

Primary Examiner—Edward P. Westin
Assistant Examiner—Jon Santamauro
Attorney, Agent, or Firm—Scott B. Stahl; Leo N. Heiting; Richard L. Donaldson

[57] ABSTRACT

An electronic circuit is constructed from a plurality of logic gates, each logic gate including a logic input, a logic output and a pair of power supply inputs, and each logic gate being operable to permit short circuit current to flow between the power supply inputs thereof during a logic level transition at the logic input thereof. A first logic gate (L) and a second logic gate (D) are provided with the output of the second logic gate connected to the input of the first logic gate, and the drive strength of the second logic gate is selected as a function of the short circuit current permitted by the first logic gate.

20 Claims, 9 Drawing Sheets

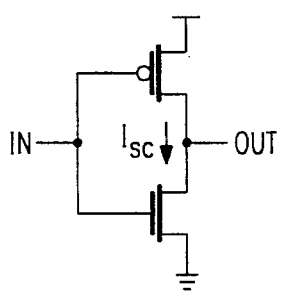
FIG. 1
*(PRIOR ART)*
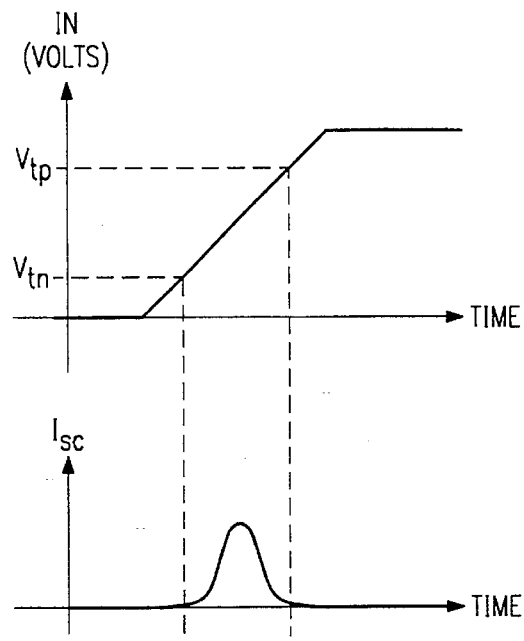
FIG. 2
|  | IV110 | IV120 | IV130 | IV140 |
|---|---|---|---|---|
| $\frac{W}{L}(P)$ | $\frac{1.8}{0.6}$ | $\frac{2.6}{0.6}$ | $\frac{3.6}{0.6}$ | $\frac{5.2}{0.6}$ |
| $\frac{W}{L}(n)$ | $\frac{1.4}{0.6}$ | $\frac{2.0}{0.6}$ | $\frac{2.8}{0.6}$ | $\frac{4.0}{0.6}$ |
FIG. 4
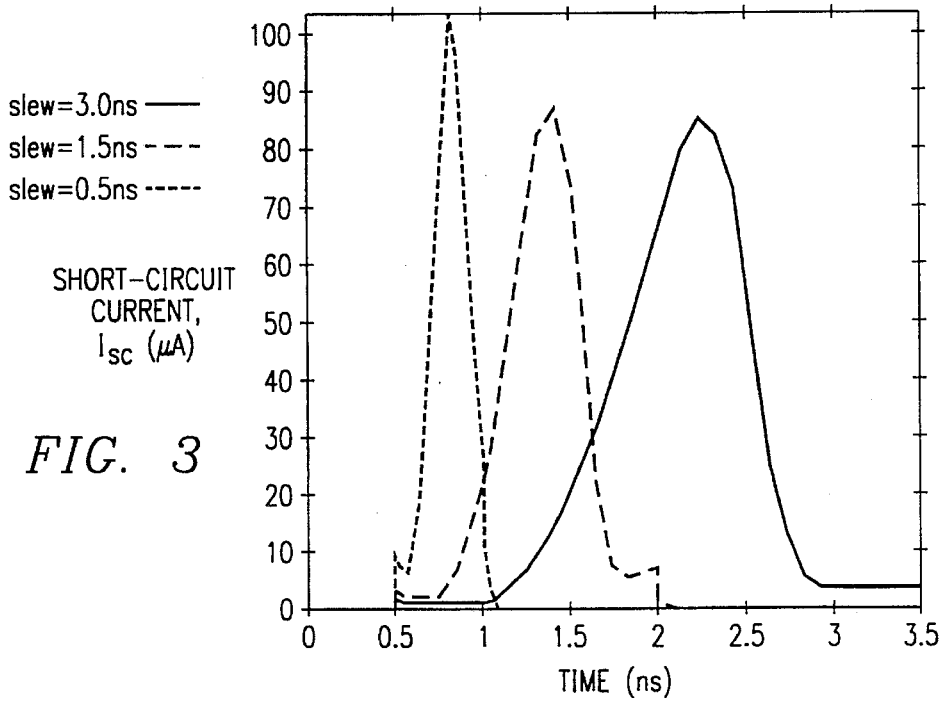
FIG. 3

$P_{sc}$ VS. INPUT SLEW FOR DIFFERENT DRIVE STRENGTHS

"DRIVER" $P_{sc}$ VS. FANOUT FOR DIFFERENT INPUT SLEWS

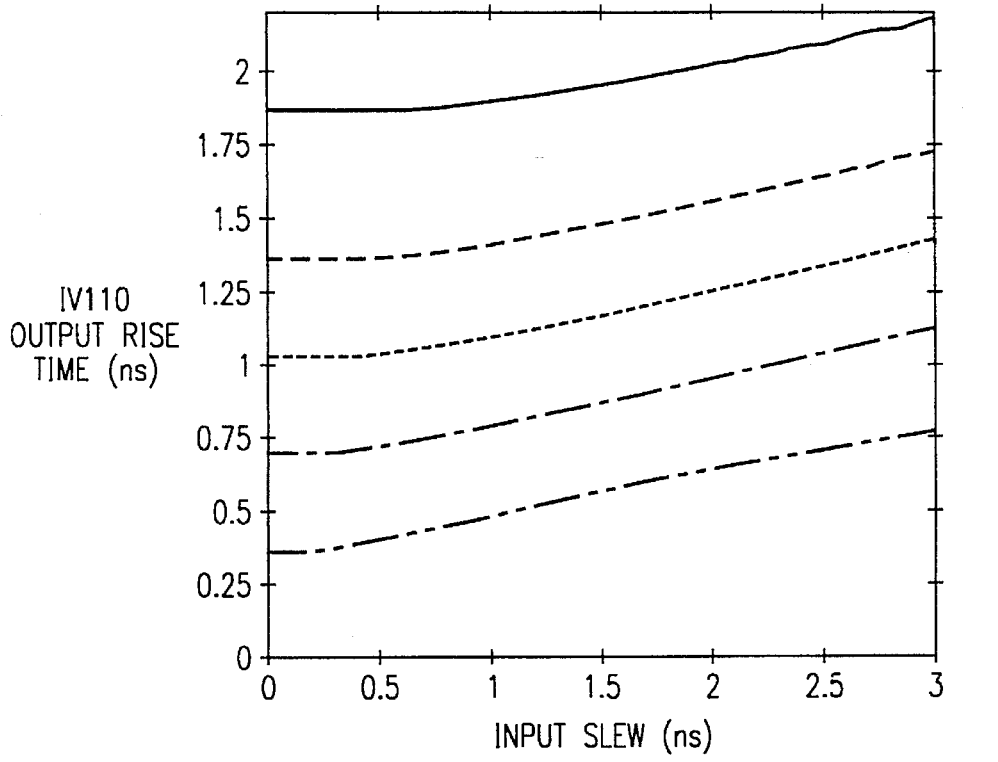
OUTPUT RISE TIME VS. INPUT SLEW FOR DIFFERENT LOADS
*FIG. 7*
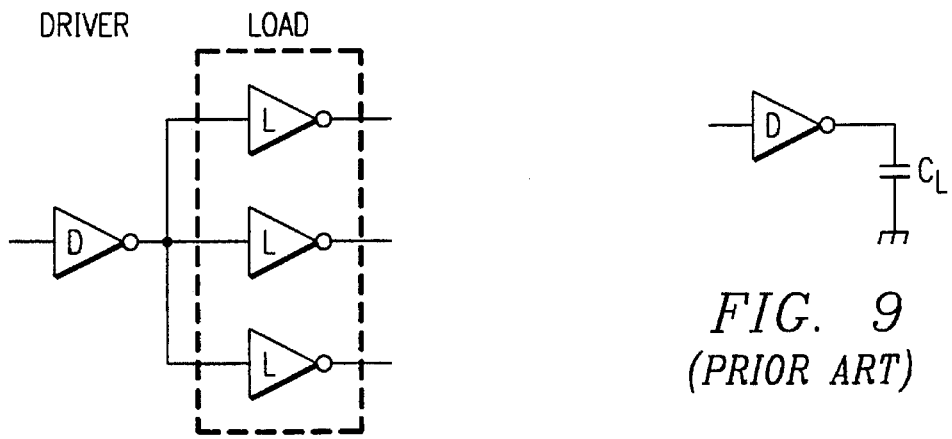
*FIG. 8*
*FIG. 9*
*(PRIOR ART)*

EFFECT OF FANOUT ON $P_{sc}$ OF THE "LOAD" GATES

TOTAL $P_{sc}$ VS. FANOUT FOR DIFFERENT INPUT SLEWS

TOTAL POWER VS. FANOUT USING IV110 AS "DRIVER" GATE

TOTAL $P_{dynamic}(=P_{sc}+P_{cap})$ VS. FANOUT @ SLEW=0.5ns

POWER RATIO (IV120/IV110) VS. FANOUT AND SLEWS

1

SHORT CIRCUIT POWER OPTIMIZATION FOR CMOS CIRCUITS

FIELD OF THE INVENTION

The invention relates generally to CMOS circuit design and, more particularly to a CMOS circuit design technique directed to reducing the total short circuit power dissipation attributable to the gates of a CMOS circuit.

BACKGROUND OF THE INVENTION

As portable electronic equipment continues its double-digit percentage growth each year while battery technology is only projected to improve by 30% over the next five years, there is a tremendous demand for low-power design solutions to bridge this technology gap. This problem is further aggravated by the fact that microprocessor on-chip clock rates are continually increasing, leading to a substantial increase in dynamic switching power consumption.

From its introduction, CMOS technology emerged as the one technology with extremely low static power dissipation. In a typical CMOS gate, most of the power dissipation is dynamic power dissipation associated with the switching of the gate from one logic state to the other. The dynamic power dissipation of a CMOS gate includes two components, capacitive power dissipation due to the charging and discharging of the total load capacitance at the output of the CMOS gate, and short-circuit power caused by the flow of through or short-circuit current through the CMOS gate from the power supply to ground.

FIG. 1 illustrates an exemplary CMOS inverter. As shown in FIGS. 1 and 2, when the CMOS inverter of FIG. 1 switches between its logic states, there is a time period during which both the p-MOSFET and the n-MOSFET conduct and thus create a direct path from the power supply to ground, permitting the flow of short-circuit current $I_{sc}$, thereby resulting in short-circuit power dissipation. In particular, from the point in time when the input voltage of the inverter reaches the switching threshold voltage $V_{tn}$ of the n-MOSFET until the point in time when the input voltage reaches the threshold voltage $V_{tp}$ of the p-MOSFET, both the n-MOSFET and the p-MOSFET are conductive, thus permitting the short-circuit current $I_{sc}$ to flow.

The total dynamic power dissipation of a CMOS gate depends upon a number of factors such as the load capacitance at the output of the CMOS gate, the strength of the CMOS gate, the switching speed of the CMOS gate, etc. Any low power solution involves optimization of one or more of these factors in order to minimize power dissipation.

The present invention provides a low power CMOS circuit design technique wherein the gate strength of a given CMOS gate is selected by considering its input slew and its output load conditions. The technique can be applied to the non-speed critical paths in a CMOS circuit in order to reduce overall power dissipation without sacrificing circuit throughput.

BRIEF DESCRIPTION OF THE DRAWINGS

FIG. 1 illustrates a conventional CMOS inverter;

FIG. 2 is a timing diagram which illustrates short-circuit current in the CMOS inverter of FIG. 1;

FIG. 3 graphically illustrates the effect of input slew on the short-circuit current of a CMOS inverter;

FIG. 4 is a chart showing the geometries of several different CMOS inverters used to illustrate the present invention;

FIG. 7 illustrates the variation of output rise-time of a CMOS inverter versus input slew for different loads;

FIG. 8 illustrates one example of the loading of a CMOS inverter;

FIG. 9 illustrates how the load circuitry of FIG. 8 is conventionally modeled for purposes of analyzing power dissipation of the driving inverter of FIG. 8;

DETAILED DESCRIPTION OF THE INVENTION

Referring again to the CMOS inverter of FIG. 1 and the short-circuit current waveform $I_{sc}$ of FIG. 2, the curves of FIG. 3 represent the short-circuit current waveform $I_{sc}$ for different input slew values, the input slew being the edge transition time of the input to the CMOS gate. As shown in FIG. 3, the waveform of the short-circuit current becomes wider timewise as the input slew increases, thus resulting in higher short-circuit power dissipation with higher input slews.

FIG. 4 illustrates the channel width and channel length parameters of p-MOSFETs and n-MOSFETs included in exemplary inverters which are used herein to illustrate the present invention. The inverters are designated in FIG. 4 as IV110, IV120, IV130 and IV140. All of the inverters illustrated in FIG. 4 are fabricated according to Texas Instrument's 0.6 micron CMOS process. Inverter IV110 is the lowest drive strength gate, that is, the minimum geometry gate, and IV120, IV130 and IV140 represent proportional increases in drive strength.

Figure 5:
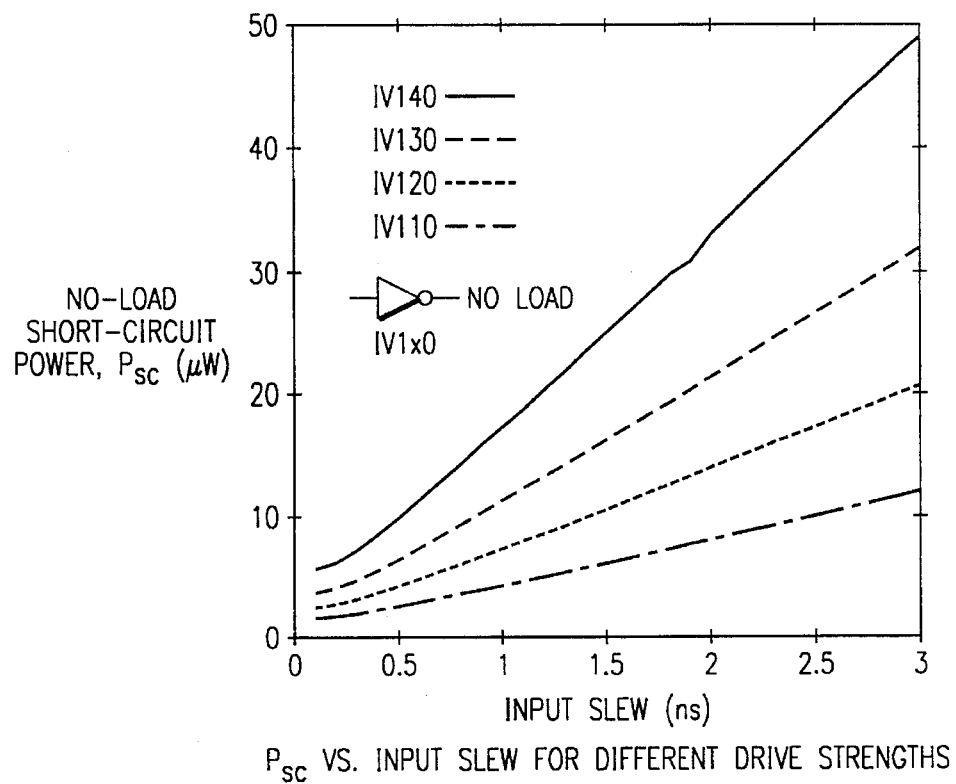
FIG. 5 is a graphical illustration of the variation of short-circuit power versus input slew for unloaded CMOS inverters of differing drive strengths.

FIG. 5 illustrates the effect of input slew on the no-load short-circuit power dissipation of the various gates of FIG. 4. The short-circuit power dissipation $P_{sc}$ increases with increasing input slew.

Considering now the case of a gate under load conditions, for a given technology the fanout of a given driving gate can be defined in terms of a standard load, for example the load offered by a single minimum geometry (lowest drive strength) inverter in that technology. Inverter IV110 is defined as the standard load for purposes of specifying fanout herein.

Figure 6:
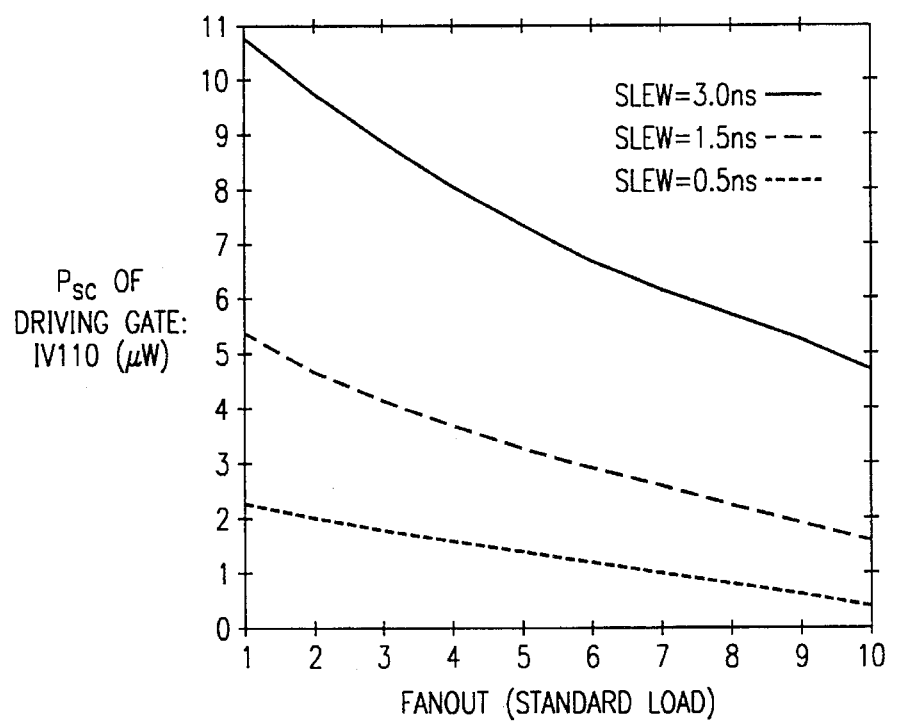
FIG. 6 graphically illustrates the variation of the short-circuit power dissipation of a CMOS inverter versus the fanout of the CMOS inverter for differing input slews.

FIG. 6 illustrates that the short-circuit power of an IV110 inverter decreases as the fanout (measured in standard loads) driven by that inverter increases. For example, if the inverter IV110 is driven by an input signal having a 0.5 ns slew time, then the short-circuit power of the inverter IV110 is approximately 2 uW when the IV110 is driving two standard loads, and is approximately 1 uW when the IV110 is driving eight standard loads.

As the fanout of a given gate increases, its load capacitance increases correspondingly, leading to an increase in the output rise and fall times of that gate. FIG. 7 illustrates the effect of fanout and input signal slew on the output rise time of an IV110 inverter gate. The worst case of output rise time (or output slew) is likely to occur in the NOR type implementation wherein stacked p-channel transistors are used.

FIG. 8 illustrates the situation contemplated in FIGS. 6 and 7 wherein a driver inverter D drives a load including one or more load inverters L. As indicated above, for ease of description, each of the load inverters L is herein assumed to be an IV110 so that the load or fanout can be characterized as an integral multiple of standard loads. In conventional analysis of the dynamic power dissipated by the driver gate D of FIG. 8, the load gates L of FIG. 8 are replaced by an equivalent load capacitance $C_L$ as shown in FIG. 9.

Using the conventional approach of FIG. 9 wherein the load gates L of FIG. 8 are replaced by their equivalent capacitance $C_L$ on the output of driver gate D, then the short-circuit power dissipated by driver gate D is as shown in FIG. 6. However, because the output slew of driver gate D increases as the load increases (see FIG. 7), the present invention recognizes from FIGS. 3 and 7 that the short-circuit power in each load gate L of FIG. 8 should also increase as the number of load gates L increases.

Figure 10:
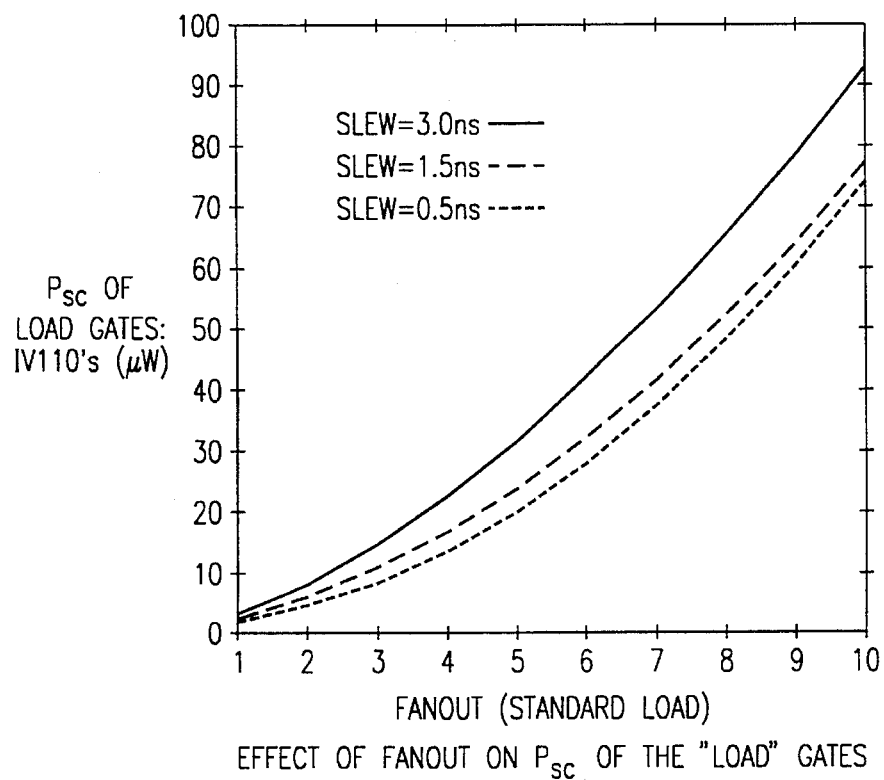
FIG. 10 graphically illustrates how the total short-circuit power dissipated in all of the load gates of FIG. 8 varies with the number of load gates.
Figure 11:
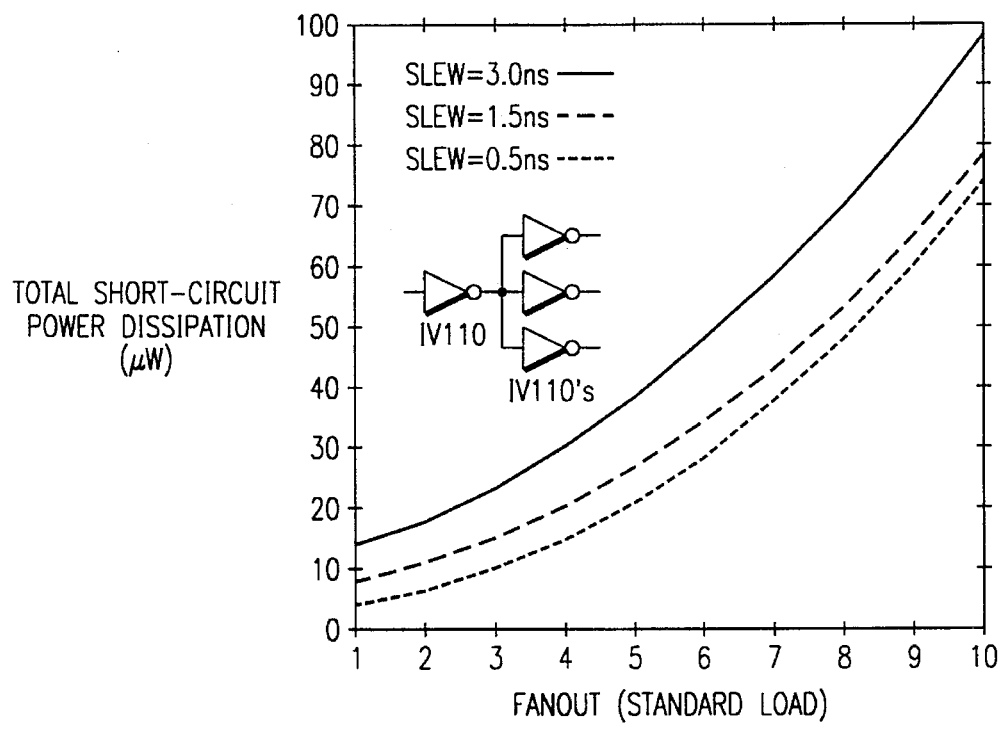
FIG. 11 graphically illustrates how the total short-circuit power dissipation of all gates in FIG. 8 varies with the number of load gates.

FIG. 10 illustrates the behavior of total short-circuit power dissipated in all of the load gates L as the fanout (the number of load gates) of driver gate D is increased, assuming driver gate D is an IV110 inverter. The behavior of short-circuit power for the load gates L is opposite to that of the driver gate D shown in FIG. 6. Considering the 3.0 ns slew line of FIG. 10, for a fanout of two standard loads, the total short-circuit power of the load gates is under 10 uW. However, for a fanout of six standard loads in FIG. 10, the total short-circuit power of the load gates is over 40 uW. The short-circuit power of the driver gate D from FIG. 6 and the short-circuit power of the load gates L from FIG. 10 are added together in FIG. 11 to illustrate the relationship between fanout and the total short-circuit power dissipated in the driver gate D and load gates L, again assuming that the driver gate D and load gates L are all IV110 inverters.

In view of the foregoing discussion of FIGS. 3, 7, 10 and 11, the present invention recognizes that a low power solution for CMOS circuit designs should preferably consider the driving gate D along with its load gates L, rather than the prior art approach of FIG. 9 wherein the driving gate D is considered along with an equivalent capacitance $C_L$ at its output.

Figure 12:
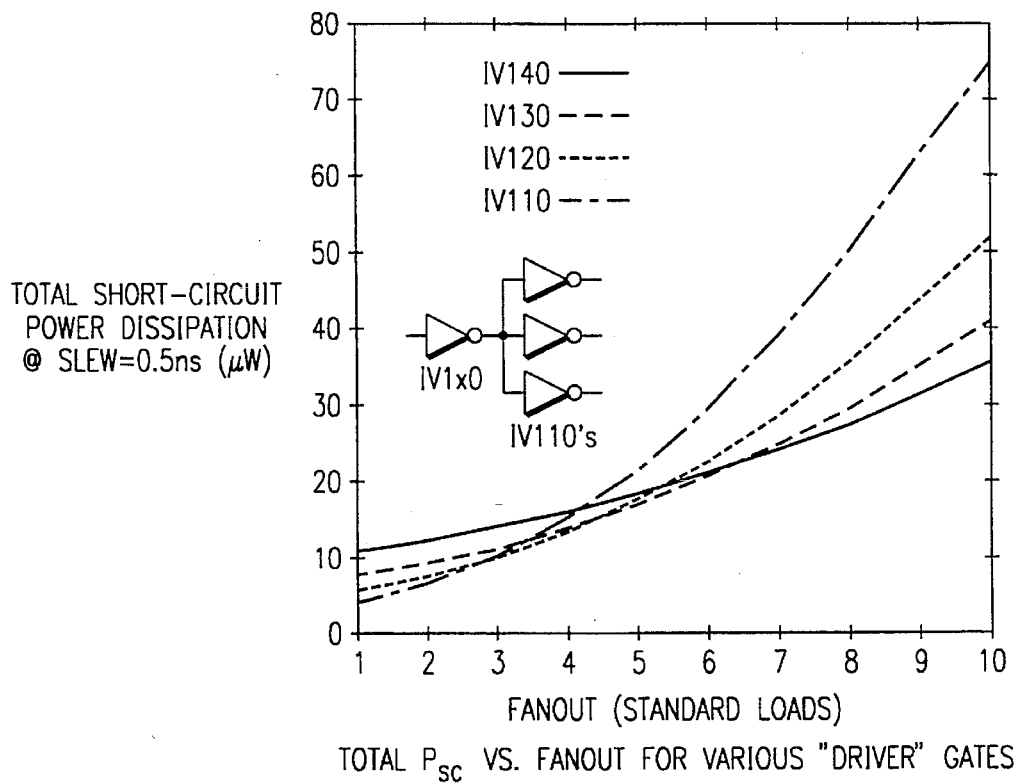
FIG. 12 graphically illustrates, for various driver gates, how the total short-circuit power dissipation of all gates in FIG. 8 varies with the fanout of FIG. 8.

FIG. 12 illustrates the behavior of the total short-circuit power dissipation of FIG. 8 for different gate strengths of the driver gate D when the output fanout is varied and the input slew is 0.5 ns. The crossover of the curves in FIG. 12 should be noted. The results for different strengths of drive gate D at heavy load conditions are opposite to that at light load conditions. That is, a driver strength which results in the lowest total short-circuit power under low fanout conditions results in the highest total short-circuit power under high fanout conditions. For example, for low fanouts (less than four standard loads), the total short-circuit power using an IV110 driver is less than the total short-circuit power using an IV140 driver, because the IV140 driver consumes more short-circuit power due to its high drive strength relative to the IV110 driver. As the fanout is increased beyond four standard loads, the output slew of the IV110 driver deteriorates considerably (see again FIG. 7), while the stronger IV140 drive gate has a lower output slew than the IV110 drive gate. The lower output slew of the IV140 drive gate results in lower short-circuit power dissipation in the load gates L in comparison to when the IV110 is used. As FIG. 12 illustrates, when the load in FIG. 8 increases beyond four standard loads, the reduced short-circuit power in the load gates achieved by the smaller output slew of the IV140 driver more than offsets the increased short-circuit power in the IV140 drive gate itself. Thus, for fanouts above four standard loads, the IV140 driver provides lower total short-circuit power dissipation than the IV110.

As previously indicated, a stronger drive gate such as the IV140 will have a higher short-circuit current, and thus a higher short-circuit power dissipation, than a weaker drive gate such as the IV110. As illustrated in FIG. 3, the longer the input slew rate, the longer the duration of the higher short-circuit current associated with the IV140 relative to the IV110. Noting that the curves of FIG. 12 were obtained with an input slew of 0.5 ns at the input of the driver gate, the crossover point of FIG. 12 will vary as the input slew varies. For example, if the input slew is 2 ns rather than 0.5 ns, then the increase in short circuit power in driver IV140 due to the increased slew will be greater than the increase in short-circuit power in driver gate IV110 due to the increased slew, thus forcing the IV110/IV140 crossover point further to the right in FIG. 12.

Figure 13A:
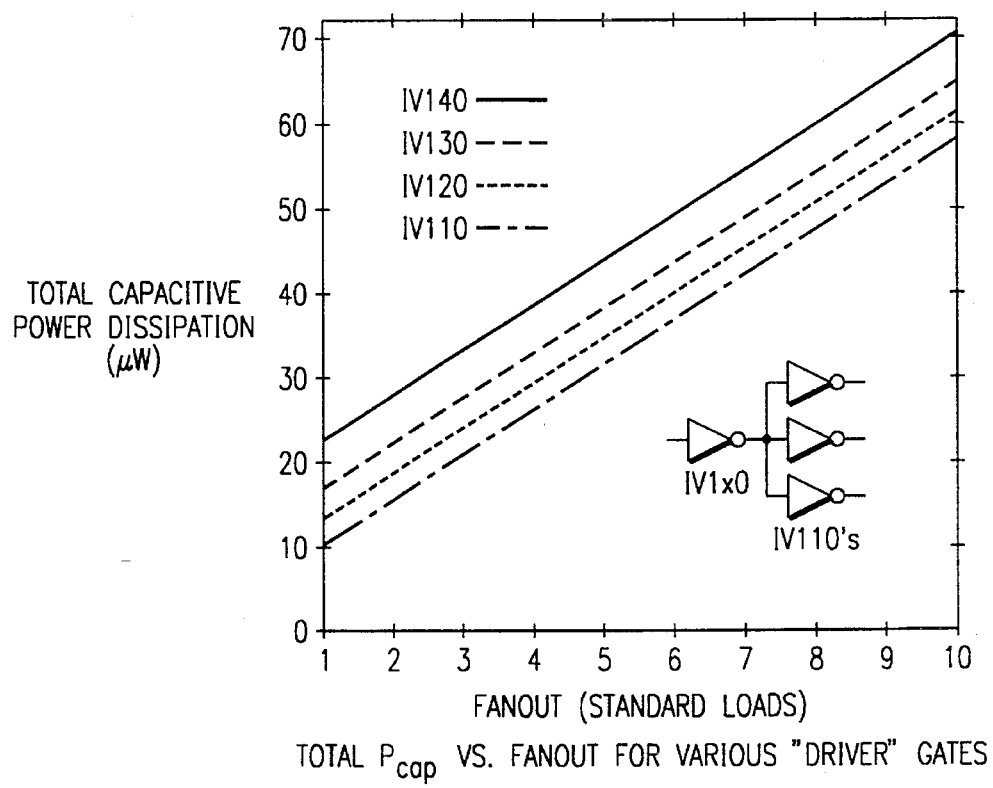
FIG. 13A graphically illustrates, for various driver gates, how the total capacitive power dissipation of the FIG. 8 arrangement varies with the fanout of FIG. 8.

FIG. 13A illustrates, for various driver gate strengths, how the total capacitive power dissipation ($P_{CAP}$) of the FIG. 8 arrangement varies with the fanout of FIG. 8, assuming a switching rate of 100 MHz. The total capacitive power dissipation of FIG. 13A is proportional to fanout and driver gate strength.

Figure 13B:
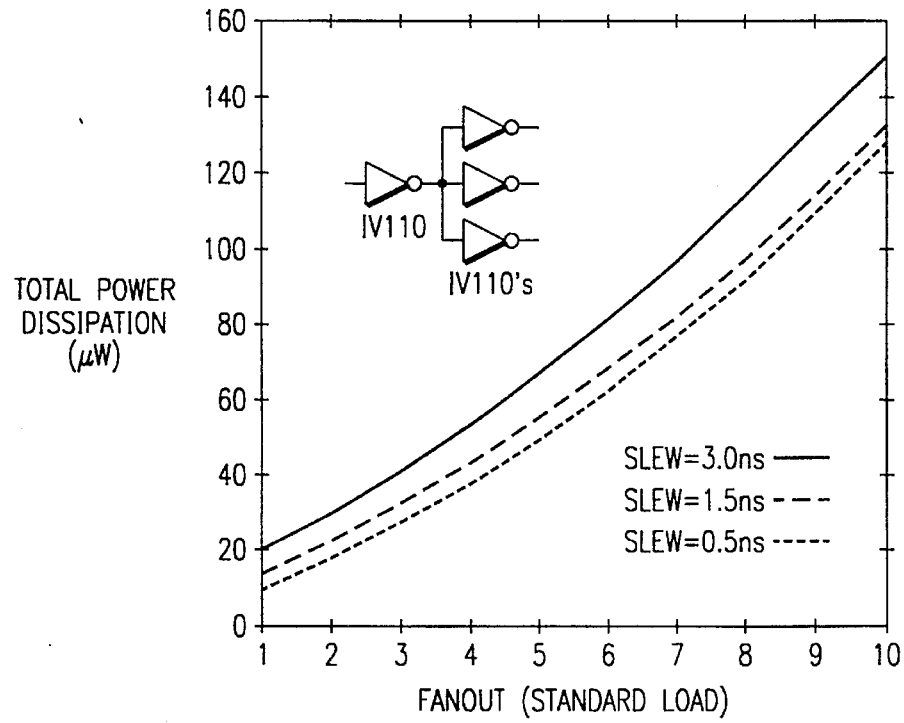
FIG. 13B graphically illustrates how the total dynamic power dissipation of the FIG. 8 arrangement varies with the load of FIG. 8.
Figure 13C:
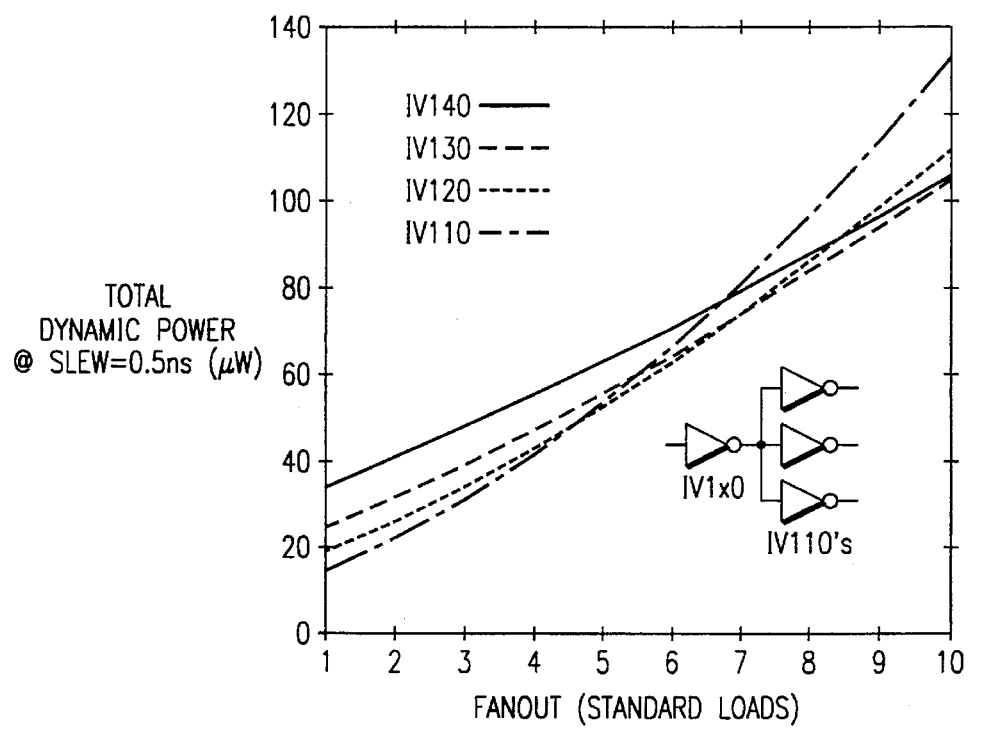
FIGS. 13C and 13D graphically illustrate, for various driver gates and slews, how the total dynamic power dissipation of the FIG. 8 arrangement varies with the fanout of FIG. 8.
Figure 13D:
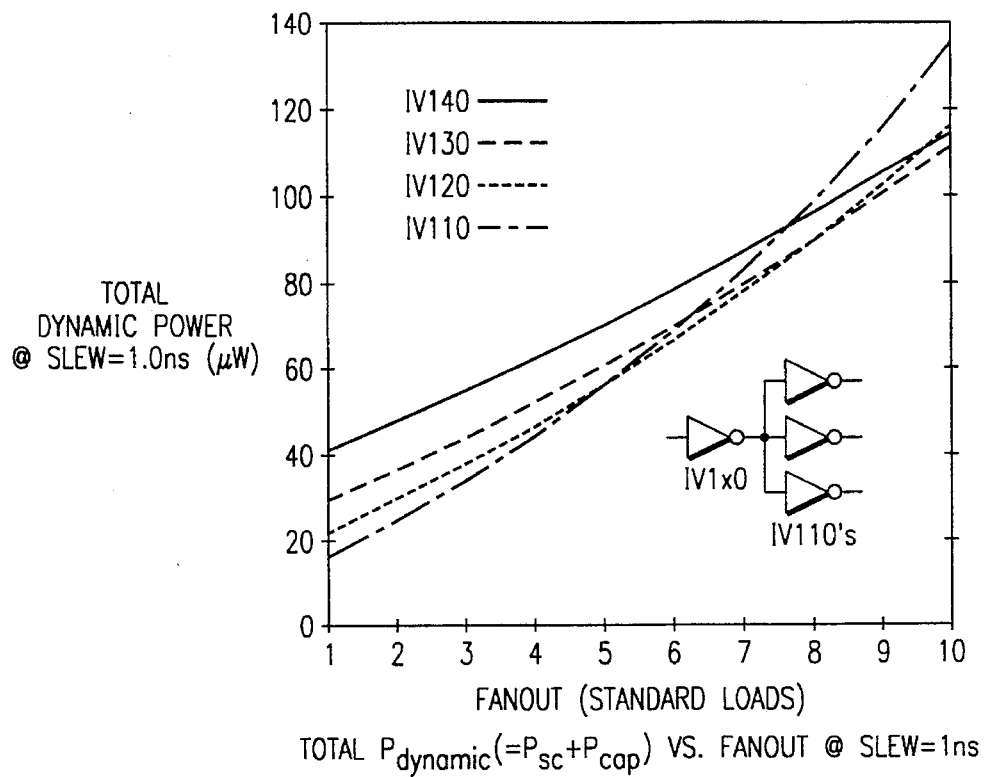

FIG. 13B illustrates the relationship between fanout and the total dynamic power dissipation in FIG. 8, assuming a 100 MHz switching rate and an IV110 driver gate. FIG. 13B thus represents in effect a summing of FIG. 11 with the capacitive power dissipation represented by the IV110 curve of FIG. 13A. FIGS. 13C and 13D illustrate the relationship between fanout and total dynamic power dissipation in the arrangement of FIG. 8 for various driver gate strengths at slews of 0.5 ns (FIG. 13C) and 1 ns (FIG. 13D) and assuming a 100 MHz switching rate. The crossover region of the total dynamic power dissipation curves of FIGS. 13C and 13D is shifted rightwardly relative to the crossover region of the total short circuit power dissipation curves of FIG. 12 due to the capacitive power dissipation component ($P_{CAP}$) of the total dynamic power dissipation curves of FIGS. 13C and 13D.

Figure 14:
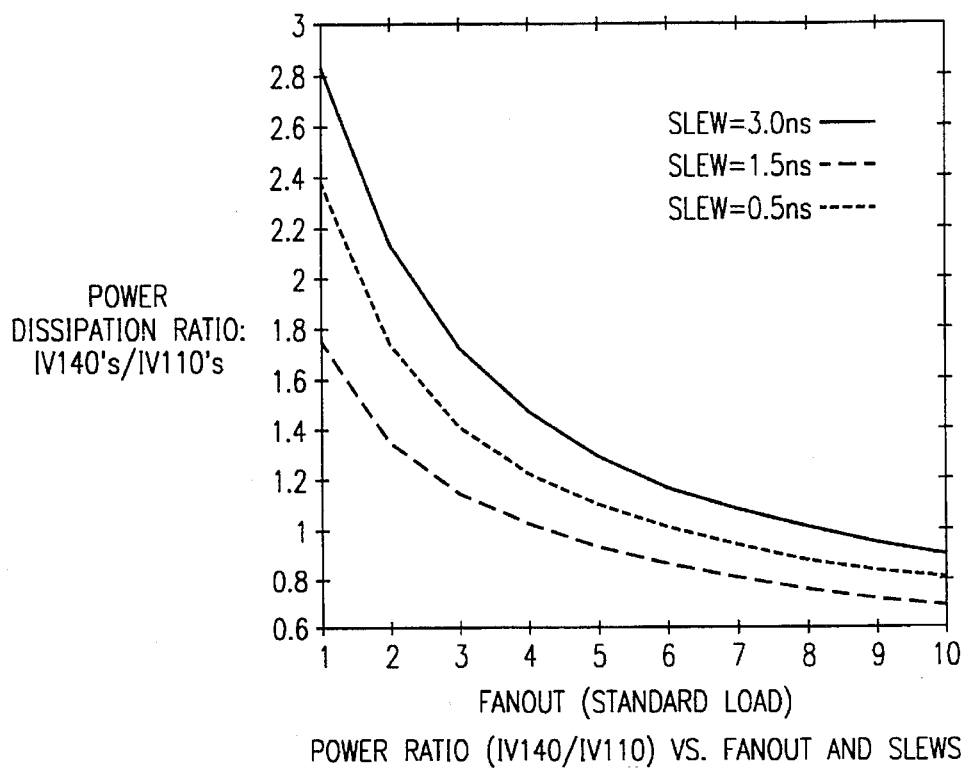
FIG. 14 graphically illustrates how the ratio of total power dissipated using a first driver inverter in FIG. 8 to total power dissipated using a second driver inverter in FIG. 8 varies with the fanout of FIG. 8.
Figure 15:
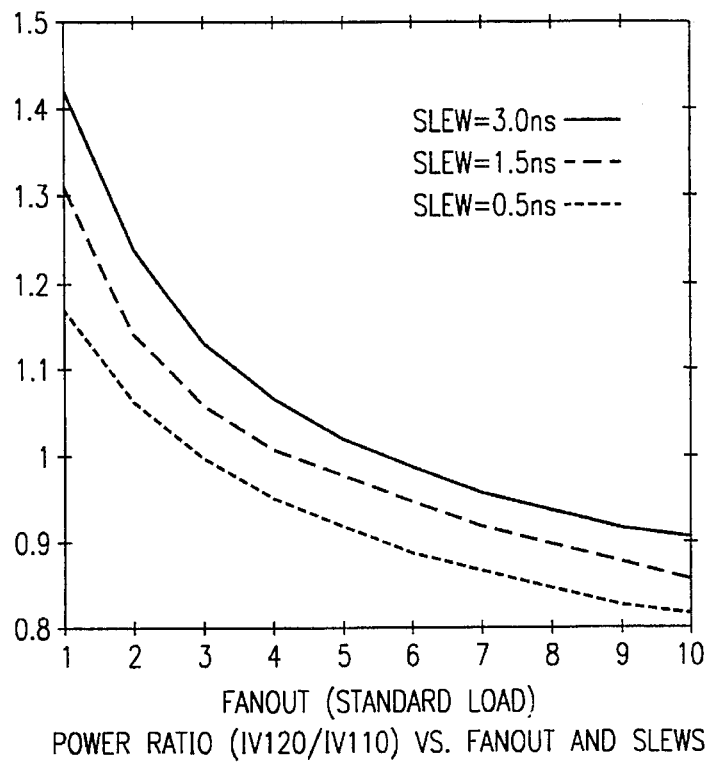
FIG. 15 is similar to FIG. 14 except the power ratio illustrated is obtained using a different pair of driver inverters.

FIG. 14 compares the total power dissipation obtained using an IV140 driver to the total power dissipation obtained using an IV110 driver. More specifically, FIG. 14 plots the ratio of total power dissipation using an IV140 driver to total power dissipation using an IV110 driver, under different input slew and output fanout conditions. FIG. 15 similarly compares the total power dissipation obtained using an IV120 driver and an IV110 driver. Using FIGS. 14 and 15, the drive gate which yields the lowest total power dissipation under given input slew and fanout conditions can be determined. For example, FIG. 14 indicates that for an input slew of 0.5 ns and a fanout of two standard loads, the power dissipation ratio of the IV140 to the IV110 is nearly 1.4, thus indicating that the IV110 will yield the lowest power dissipation in the arrangement of FIG. 8. However, with the same input slew but a fanout of five standard loads, the ratio of FIG. 14 is less than 1, indicating that the IV140 driver yields the lowest power dissipation. Similarly in FIG. 15, an input slew of 3 ns and a fanout of two standard loads indicates that the IV110 provides the lowest power dissipation, while a fanout of seven standard loads with an input slew of 3 ns indicates that an IV120 is preferable to the IV110 for minimizing power dissipation.

For any given technology, a table of appropriate drive strengths based on input slew and output fanout can be developed for each cell in the library in the manner illustrated in FIGS. 14 and 15. These tables can then be used by any automated optimization tool to reduce power dissipation by appropriate choice of drive gate strength. The larger the available selection of drive gate strengths for each cell, the better the result will be in terms of power reduction.

Data such as that shown in FIGS. 14 and 15 can be used to select the drive gate strengths in all non-speed critical paths of a given CMOS circuit design. The drive gate strength is selected according to data such as illustrated in FIGS. 14 and 15, as a function of the output load and input slew conditions that the drive gate will see. The selection of drive gates will typically work from output stages of the CMOS circuit backward toward the inputs, because primary output loads are generally dictated by the system environment in which the CMOS circuit is used. However, as will be apparent from the following description, the selection could also proceed from input stages forward.

Figure 16:
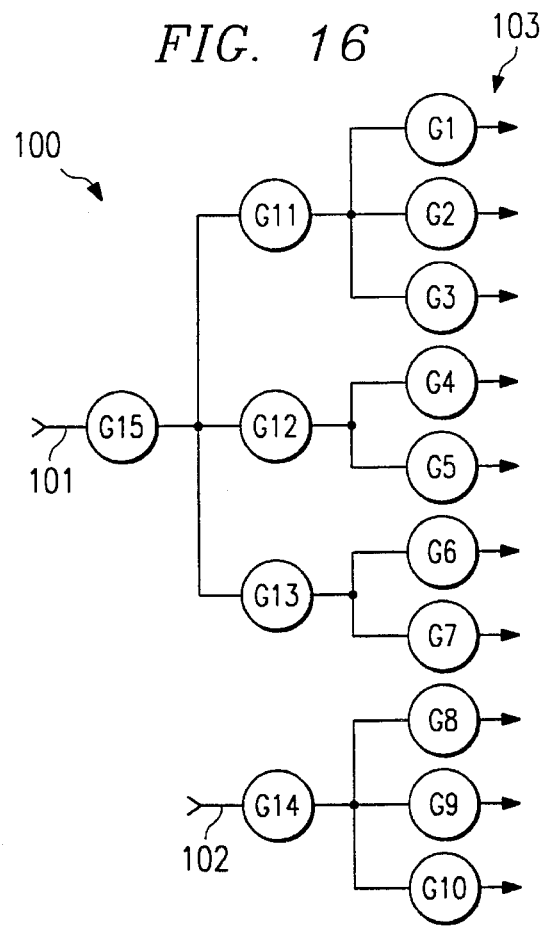
FIG. 16 illustrates an exemplary CMOS circuit to which the present invention is applicable.

FIG. 16 illustrates at 100 several exemplary signal paths in a CMOS circuit module. The signal paths at 100 are driven by inputs 101 and 102 and produce a plurality of outputs at 103. The inputs 101 and 102 are typically received from a circuit module upstream from the signal paths of FIG. 16, and the outputs at 103 drive the inputs of another circuit module downstream from the FIG. 16 signal paths. The signal paths of FIG. 16 include CMOS gates G1–G15, and are all assumed, for purposes of example, to be non-speed critical signal paths. The gates G1–G15 of the exemplary signal paths are analyzed according to the present invention as follows.

The input slew of the signals 101 and 102 will be the known output slew of the circuit module upstream from FIG. 16, and the loads driven by each of the outputs 103 will be defined by the known inputs of the circuit module being driven by outputs 103. It is initially assumed that each of gates G1–G15 is the minimum geometry (and hence minimum drive strength) gate available for the desired function. For example, if gate G11 is an inverter, then it is assumed that gate G11 is the minimum geometry inverter available, such as an IV110 as described above. Similarly, if gate G12 is a NAND gate, then it is assumed that gate G12 is the minimum geometry NAND gate available. Because the geometry and drive strength of each gate is assumed, the load (as a multiple of a known standard load) presented by the input of each gate is also known. Because the input load presented by each gate is known, and because the input slews of signals 101 and 102 are also known, the input slew at each of gates G1–G13 is easily determined using curves such as those shown in FIG. 7. For example, if the input slew of signal 101 at the input of G15 is 0.5 ns, and if gates G11–G13 each present one standard load, then FIG. 7 indicates that the output rise time of gate G15, which is also the input slew for gates G11–G13, is approximately 0.75 ns. Repeated application of this technique permits determination of the input slew for each gate of FIG. 16.

Once the input slews of gates G1–G13 have been determined, then the techniques described above with respect to FIGS. 14 and 15 can be applied to determine the appropriate drive strength for gates G1–G13. More specifically, for each of gates G1–G10, the appropriate drive strength of the gate is determined by considering its input slew and the load presented to the output of the respective gate. In this instance, the load presented to the output of each gate G1–G10 is known from the design of the downstream circuit module driven by FIG. 16. After the drive strength for each of gates G1–G10 is determined, then the drive strength of gate G11 is determined based upon its input slew and the load presented by gates G1–G3, the drive strength of gate G12 is determined based upon its input slew and the load presented by gates G4 and G5, the drive strength of gate G13 is determined based upon its input slew and the load presented by gates G6 and G7, and the drive strength of gate G14 is determined based upon its input slew and the load presented by gates G8–G10. Once the drive strengths of gates G11–G13 have been determined, then the drive strength of gate G15 can be determined based upon its input slew and the load presented by gates G11–G13.

It should be noted from the above description that the initial assumption of minimum geometry (low drive strength) gates is only an assumption of convenience and, although some drive strength must be attributed to each gate in order to begin applying the technique of the present invention, the above-described assumption of minimum geometry gates is not required by the present invention. For example, the initial drive strengths of gates G1–G15 could alternatively be selected so as to optimize the performance of FIG. 16.

One major constraint, which may also be used as a criterion to terminate the low power optimization procedure, is to monitor, during the process of selecting the driver gates, the delay of all the non-speed critical paths to which the technique is applied and ensure that the delay obtained using the selected driver gate does not exceed the applicable design constraint, that is, does not exceed the delay of the speed-critical path of the module. In this manner, the power dissipation of the CMOS circuit can be reduced without degrading its performance.

It is noted that the data of FIGS. 14–15 can be utilized in the form of tables or mathematical equations as well as the graphical form presented in FIGS. 14–15.

Figure 17:
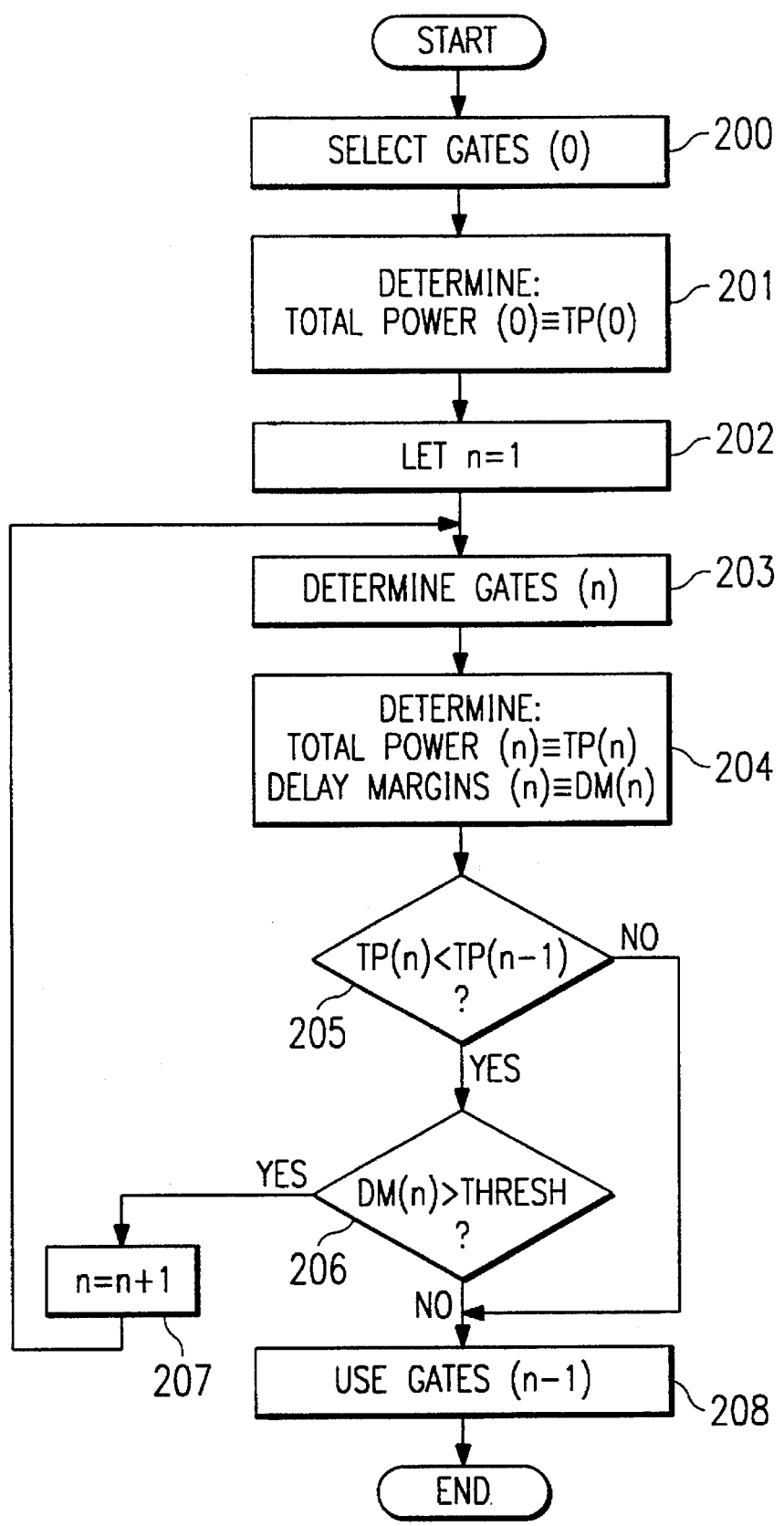
FIG. 17 is a flow chart which illustrates an exemplary design approach according to the present invention.

FIG. 17 illustrates an exemplary CMOS circuit design technique which incorporates the above-described features of the present invention. At step 200 in FIG. 17, the initial gates of the circuit are selected and designated as gates(0).

The gates(0) may all be minimum geometry gates as described above. However, it should be clear that the gates(0) must provide the desired functionality of the CMOS circuit. In this connection, it is noted that, in some instances, a minimum geometry gate may have inadequate drive strength to drive the required load. In such case, that particular gate could be, for example, the minimum drive strength gate capable of adequately driving the required load. Of course, and as indicated above, gates(0) need not necessarily be minimum drive strength gates at all. For example, gates(0) could alternatively be selected so as to optimize the performance of the CMOS circuit.

After the initial gates, gates(0), have been selected in step 200, the total power dissipation associated with gates(0) is determined in step 201 and designated as TP(0).

After the initial total power TP(0) has been determined in step 201, a counter variable n is set to 1 in step 202. Thereafter, in step 203, the technique described above with reference to FIGS. 14 and 15 is employed to replace gates(0) of the CMOS circuit as appropriate. Because one or more of the initial gates(0) are replaced in step 203, the gates of the CMOS circuit are designated as gates(n) in and after step 203. Thus, after the first execution of step 203 (with n=1), the gates of the CMOS circuit would be designated as gates(1). After gates(0) have been replaced as necessary to arrive at gates(l) in step 203, the total power dissipated by gates(1) is determined in step 204 and designated as TP(1). Also in step 204, the delay margins of the non-speed critical paths of the CMOS circuit defined by gates(l) are determined and collectively designated as DM(1). The delay margin of a given a non-speed critical path is the difference between the delay of that non-speed critical path and the delay of the speed critical path of the CMOS circuit. For example, if the delay of the speed critical path is 10 ns and the delay of a given non-speed critical path is 7 ns, then the delay margin associated with that given non-speed critical path is 10−7=3 ns. After step 204, step 205 determines whether TP(1) is less than TP(0). If no, then gates(0) are selected for the design at 208. If yes at step 205, then step 206 determines whether all delay margins represented by DM(1) are greater than a predetermined threshold delay margin value. If no at 206, then gates(0) are selected for the design at 208.

If yes at 206, then step 207 increments the counter variable n from 1 to 2. Tereafter, the technique described above with respect to FIGS. 14 and 15 is applied to gates(1) at step 203 to thereby determine gates(2). Thereafter, at step 204, the total power and delay margins associated with the newly determined gates(2) are determined. Step 205 then determines whether the total power associated with gates(2) is less than the total power associated with gates(1). If no, then gates(1) are selected for the design at 208. If yes at 205, then step 206 determines whether all of the delay margins associated with gates(2) are greater than the predetermined threshold value. If no at 206, then gates(l) are selected for the design at 208. If yes at 206, then the counter variable n is incremented from 2 to 3 at 207, and the process returns again to step 203 to generate gates(3).

Steps 203–207 are sequentially executed and repeated until either step 205 or step 206 yields a result of no, whereupon the process is halted with gates(n−1) selected for the design at 208.

As noted above, the technique of FIGS. 14 and 15 is applied only to non-speed critical paths, and is not applied to speed critical paths.

The above-described technique for selecting drive gate strength may also result in a reduction in circuit area. As with any other circuit optimization method, results achieved by the above-described selection technique also depend upon the structure or characteristics of the original circuit. Circuits with a high percentage of non-speed critical paths will achieve better results than those with a low percentage. The reduction in the integrated circuit area will depend upon the load conditions in the circuit. For example, light load conditions tend to lean toward drive gates with low drive strengths, which occupy less silicon area that high drive strength gates.

The above-described drive gate replacement technique has been implemented in a CMOS 32 bit carry look ahead adder circuit with results of 28% power reduction and 41% integrated circuit area reduction.

The present invention permits reduction of dynamic power consumption in logic by manually or automatically replacing drive gates with either higher or lower drive strength gates. This provides a trade-off of power consumption against timing performance and area overheads without extensively running SPICE type circuit simulations. The invention reduces dynamic power dissipation and tends to reduce silicon area, without sacrificing critical path performance. The techniques of the invention can be readily incorporated into any power optimization or synthesis tool.

Although exemplary embodiments of the present invention are described above, this description does not limit the scope of the invention, which can be practiced in a variety of embodiments.

What is claimed is:

1. A method of constructing an electronic circuit from a plurality of logic gates, each said logic gate including a logic input and a logic output and a pair of power supply inputs, wherein each said logic gate will exhibit short circuit power dissipation during operation of the electronic circuit due to short circuit current flow between the power supply inputs of the logic gate during a logic level transition at the logic input of the logic gate, comprising the steps of:

selecting a first logic gate; and
  selecting a second logic gate to drive said first logic gate, including selecting a drive strength for said second logic gate based on a total of all short circuit power that would be dissipated by said first and second logic gates during operation of the electronic circuit if said second logic gate were driving said first logic gate.

2. The method of claim 1, including connecting an output of said second logic gate to an input of said first logic gate.

3. An electronic circuit constructed according to the method of claim 2.

4. The method of claim 1, wherein said first and second logic gates are CMOS gates.

5. The method of claim 4, wherein said CMOS gates are inverters.

6. A method of constructing an electronic circuit from a plurality of logic gates, each said logic gate including a logic input and a logic output and a pair of power supply inputs, wherein each said logic gate will exhibit short circuit power dissipation during operation of the electronic circuit due to short circuit current flow between the power supply inputs of the logic gate during a logic level transition at the logic input of the logic gate, comprising the steps of:

selecting a group of logic gates; and
  selecting a further logic gate to drive said group of logic gates, including selecting a drive strength for said further logic gate based on a total of all short circuit power that would be dissipated by said further logic gate and said group of logic gates during operation of the electronic circuit if said further logic gate were driving said group of logic gates.

7. The method of claim 6, including connecting an output of said further logic gate to an input of each logic gate of said group.

8. An electronic circuit constructed according to the method of claim 7.

9. The method of claim 6, wherein said further logic gate and said logic gates of said group are CMOS gates.

10. The method of claim 9, wherein said CMOS gates are inverters.

11. A method of constructing an electronic circuit from a plurality of logic gates, each said logic gate including a logic input and a logic output and a pair of power supply inputs, wherein each said logic gate will exhibit short circuit power dissipation during operation of the electronic circuit due to short circuit current flow between the power supply inputs of the logic gate during a logic level transition at the logic input of the logic gate, comprising the steps of:

selecting a first logic gate;

selecting one of a second logic gate and a third logic gate to drive said first logic gate, said second and third logic gates having respectively different drive strengths; and said selecting step including determining the smaller of (1) a first total of all short circuit power that would be dissipated by said first and second logic gates during operation of the electronic circuit if said second logic gate were driving said first logic gate and (2) a second total of all short circuit power that would be dissipated by said first and third logic gates during operation of the electronic circuit if said third logic gate were driving said first logic gate, choosing said second logic gate to drive said first logic gate if the first total is less than the second total, and choosing said third logic gate to drive said first logic gate if the second total is less than the first total.

12. The method of claim 11, including connecting an output of said second logic gate to an input of said first logic gate if said second logic gate is selected to drive said first logic gate, and connecting an output of said third logic gate to the input of said first logic gate if said third logic gate is selected to drive said first logic gate.

13. An electronic circuit constructed according to the method of claim 12.

14. The method of claim 11, wherein said logic gates are CMOS gates.

15. The method of claim 14, wherein said CMOS gates are inverters.

16. A method of constructing an electronic circuit from a plurality of logic gates, each said logic gate including a logic input and a logic output and a pair of power supply inputs, wherein each said logic gate will exhibit short circuit power dissipation during operation of the electronic circuit due to short circuit current flow between the power supply inputs of the logic gate during a logic level transition at the logic input of the logic gate, comprising the steps of:

selecting a group of logic gates;

selecting one of a first logic gate and a second logic gate to drive said group of logic gates, said first and second logic gates having respectively different drive strengths; and said selecting step including determining the smaller of (1) a first total of all short circuit power that would be dissipated by said first logic gate and said group of logic gates during operation of the electronic circuit if said first logic gate were driving said group of logic gates and (2) a second total of all short circuit power that would be dissipated by said second logic gate and said group of logic gates during operation of the electronic circuit if said second logic gate were driving said group of logic gates, choosing said first logic gate to drive said group of logic gates if the first total is less than the second total, and choosing said second logic gate to drive said group of logic gates if the second total is less than the first total.

17. The method of claim 16, including connecting an output of said second logic gate to an input of each logic gate of said group if said second logic gate is selected to drive said group, and connecting an output of said first logic gate to said input of each logic gate of said group if said first logic gate is selected to drive said group.

18. An electronic circuit constructed according to the method of claim 17.

19. The method of claim 16, wherein said logic gates are CMOS gates.

20. The method of claim 19, wherein said CMOS gates are inverters.

* * * * *